INVENTOR.
Carl D. Andrysiak
BY
ATTORNEY

United States Patent Office 3,743,494
Patented July 3, 1973

3,743,494
HEADER SYSTEM FOR FORMING MULTI-BORE TUBING
Carl D. Andrysiak, Painted Post, N.Y., assignor to Corning Glass Works, Corning, N.Y.
Continuation-in-part of application Ser. No. 765,495, Oct. 7, 1968. This application Feb. 5, 1971, Ser. No. 113,003
Int. Cl. C03b 5/26, 15/14
U.S. Cl. 65—126
8 Claims

ABSTRACT OF THE DISCLOSURE

Multiple-bore tubing having uniform bore sizes and wall thicknesses is formed by drawing molten glass downwardly through a multiple bell orifice structure having a header system arranged substantially concentrically about the center of the orifice structure which provides blowing air at desired differential pressures to various concentric arrays of bells to form uniform multiple bore tubing with an open frontal area of up to about 80 percent of the cross-sectional area of such tubing.

CROSS REFERENCE TO RELATED APPLICATIONS

This application is a continuation-in-part of my co-pending application Ser. No. 765,495 filed Oct. 7, 1968 now Patent No. 3,607,185 issued Sept. 21, 1971.

BACKGROUND OF THE INVENTION

The invention pertains to the continuous manufacture of multi-bore tubing from molten glass. The formation of thickwalled tubing having a limited number, i.e., 2–4, of relatively large channels or bores has been known in the past.

Danner Patent. No. 2,131,417, representative of the prior art, discloses a partitioned hollow mandrel or forming member over which molten glass is poured to form glass tubing having two or three bores. Not only is the number of bores obtainable with the Danner device limited by the structural capabilities of the forming member, but also the molten glass flowing along the walls of each bore combines with the glass flowing along the walls of and adjacent bore or the outer surface of the forming member to form multiple-bore tubing having double wall thickness about each bore. In view of the fact that the Danner patent does not apply selective air pressures to various bells in a downdraw orifice but rather applies a single pressure to glass flowing downwardly over a suspended forming member, it is difficult to obtain uniform flow rates and wall thicknesses.

U.S. Patent No. 3,240,583 discloses a further method and apparatus for forming multiple-bore tubing by drawing glass upwardly between shaping devices disposed within the surface of a pool of molten glass. Such an arrangement, being an updraw requiring relatively high viscosity to retain continuity and having but one pressure source applied to all shaping devices, is generally adaptable to the production of large bore tubing having relatively thick walls.

Therefore, although the prior art contemplated the manufacture of multiple-bore tubing, it was limited in its application to the manufacture of only a few bores with relatively thick walls therebetween. Such devices, did not recognize the need for providing arrays of concentrically arranged bells with varying pressures dependent upon the distance of the array from the center of the orifice, and thus were incapable of producing uniform multiple bore tubing having an open frontal area of up to 80 percent with a hole density of over 100 holes or bores per square inch of cross-sectional area.

SUMMARY OF THE INVENTION

The present invention relates to apparatus for forming multiple-bore tubing having an open frontal area of up to 80 percent with more than 100 openings or bores per square inch. Such multiple mini-bore tubing is formed by passing molten glass downwardly through a geometrically-shaped discharge passage of an orifice having a plurality of geometrically arranged bells which are connected to various sources of air under pressure. Each bell forms an individual bore in the multiple bore tubing, and uniform spacings between adjacent bells provides the control for uniform thin-walled tubing. The bells are preferably arranged so as to provide a plurality of concentric radially disposed bores with the interior bores being enclosed within the walls of the outer bores.

A plurality of headers supply air under pressure to the various bells in such a manner so that each header supplies a common pressure to all bells positioned within an array substantially equally distant from the center of the orifice. Molten glass is fed through such orifice at a controlled rate and pulled downwardly and attenuated into tubing having a plurality of bores equal to the number of bells in the orifice and having an outer configuration substantially conforming to the peripheral configuration of the orifice.

It has thus been an object of the present invention to provide an orifice structure having a plurality of individually supplied headers arranged concentrically about the center of the orifice for forming multiple-bore tubing having improved dimensional uniformity with an open frontal area of the between about 40% and 80% and a transverse cross section exhibiting over 100 bores per square inch.

DESCRIPTION OF THE PREFERRED EMBODIMENTS

Figure 1:
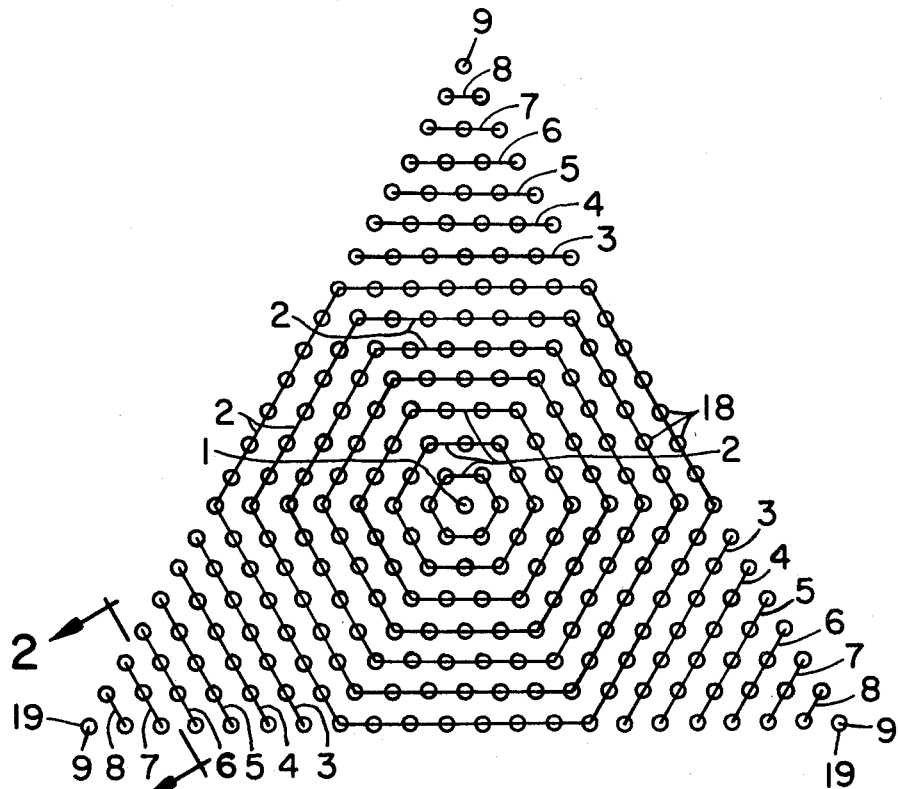
FIG. 1 is a schematic illustration of a hexagonal header system concentrically arranged about the center of a triangular-shaped orifice.

Referring now to the drawings, and particularly FIG. 1, a schematic arrangement of manifolds or headers is shown for a plurality of bells positioned within a triangular-shaped orifice. The view depicts a bell and header arrangement as would be seen when looking downwardly through a glass-dispensing orifice for forming triangular-shaped multi-bore tubing. Each of the bells 18 is provided with air from a suitable source, and forms a bore in the multiple-bore tubing produced by the flow of glass downwardly through the orifice structure. The bells 18 are manifolded by a plurality of hexagonally arranged manifolds or headers 1–9 which are concentrically positioned about and radially spaced outwardly from the center of the triangular-shaped orifice.

Figure 2:
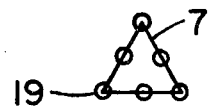
FIG. 2 is a fragmental schematic illustration of a further embodiment of the invention for manifolding corner portions of a triangular orifice and taken along line 2—2 of FIG. 1.

As shown, a manifold 1 supplies air under pressure to a central bell 18, whereas a plurality of radially spaced-apart concentric hexagonal manifolds 2 supply individual air pressures to various hexagonal arrays of bells 18 concentrically arranged about the central bell. In a like manner, a plurality of manifolds 3, 4, 5, 6, 7, 8 and 9 supply individual pressures to different groups of bells 18 arranged in configurations equally spaced from the central bell. That is, each manifold or header 3 is connected to the same source of air under pressure so as to supply each group of bells, substantially equi-distant from the center of the orifice, with a common air pressure. In a like manner each set of equi-distant manifolds is connected to a separate source of air under pressure, so that the pressure applied to the various groups or arrays of bells will vary with the distance of such array from the center of the orifice. If desired, the corner bells 19 may be connected by a triangular manifold to a common source of air under pressure with the bells of manifolds 7 or 8, as shown in the alternate fragmental view of FIG. 2.

Figure 3:
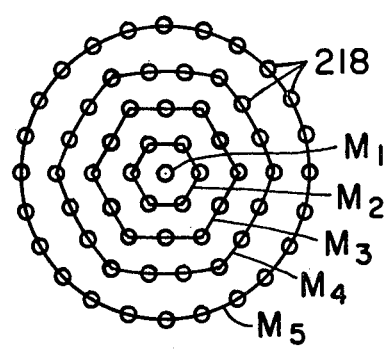
FIG. 3 is a schematic illustration of a header system, embodying the present invention, for manifolding a circular orifice.

Referring now to FIG. 3, a schematic representation is shown for manifolding a plurality of bells 218 positioned within a circular orifice. As can be seen from FIG. 3, the bells 218 are provided with a plurality of concentric manifolds about the center of the orifice structure. That is, manifold $M_1$ supplies pressure to the central bell, whereas manifold $M_2$ supplies a separate pressure source to the next symmetrical grouping or array of bells 218 surrounding the central bell. Likewise, manifold $M_3$ supplies a separate source of pressure to the next radially-outwardly spaced grouping of bells, which is of a concentric hexagonal configuration similar to manifold $M_2$. Manifold $M_4$, supplying a separate source of pressure to the next concentric grouping or array of bells, is in the shape of a rounded hexagonal, whereas the outer grouping of bells 218 is supplied with air under pressure from a circular manifold $M_5$. The manifolding of the bells 218 is characterized by the fact that the manifolds are symmetrically arranged about the center of the orifice structure, and in effect expand outwardly from such central point so as to provide varying degrees of air under pressure to the different concentric arrays of bells, relative to their positionment with respect to the center of the glass delivery orifice.

The bells 18 of the triangular-shaped orifice and the bells 218 of the circular-shaped orifice are manifolded by a plurality of symmetrical or concentric headers or manifolds which are radially spaced-apart from the center of the orifice structure. Each header or manifold is provided with a separate source of air under pressure so that the size of the bores formed by the individual bells may be controlled uniformly as they diverge from the center of the orifice. As a practical matter, the central header is usually provided with the highest applied pressure, with the succeeding outwardly disposed headers each being provided with a lesser amount of pressure so that the furtherest radially disposed header will be provided with the least amount of pressure in the overall system. An exception to this general rule may exist in the manufacture of triangular-shaped multi-bore tubing wherein it may become necessary to apply a greater pressure adjacent the corner portions, i.e., see FIG. 2, in order to overcome the formation of unduly small bores due to excessive attenuation in such corner areas.

Referring now to FIGS. 4 through 8, an orifice structure 20 is shown having 55 bells 22 symmetrically arranged with respect to the center of the discharge passage 24 of such orifice structure. As shown schematically in FIG. 4, a plurality of hexagonal headers are concentrically or symmetrically positioned about a central bell for individually supplying fluid under specified pressures to various arrays of bells which are substantially equally distant from the center of the orifice. An outer hexagonal header 26 is supplied with fluid under pressure by means of input conduits 28, a middle hexagonal header 30 is supplied by another source of fluid under pressure by means of input conduits 32, and the inner hexagonal header 34 is supplied with its fluid pressure from another source by means of input conduit 36. The central bell 22 is provided with its own source of fluid under pressure by means of input conduit 38.

Figure 4:
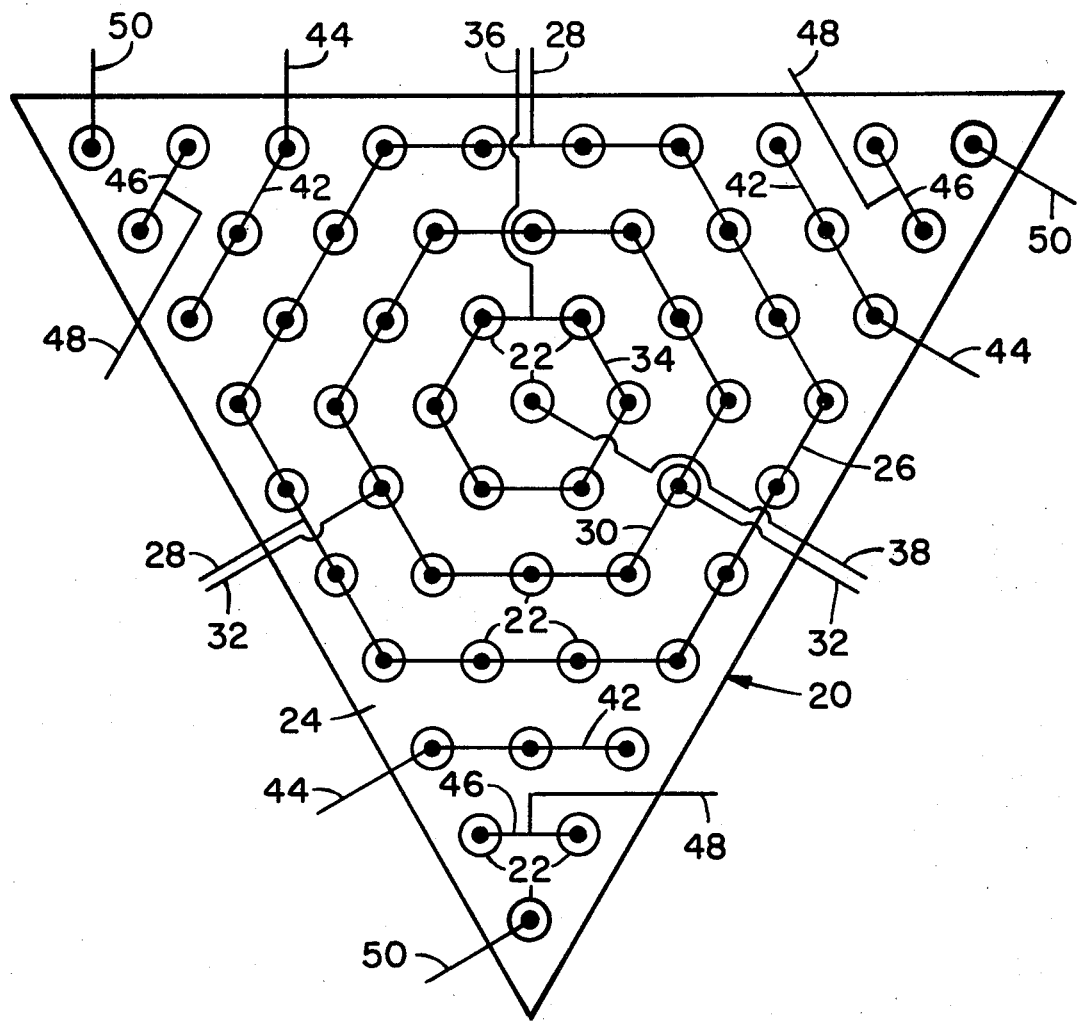
FIG. 4 is a further schematic illustration of a header system embodying the present invention and showing the arrangement of air input conduits to the various headers so as to facilitate the application of differential or individual pressures to each such header.

Each corner portion of the triangular orifice structure 20 has a plurality of arrays of bells which are radially spaced apart from the central bell outwardly from the hexagonal headers. Although the headers for the corner bells structurally take the form of a triangle 40 (FIG. 7) to facilitate fabrication, the various arrays of bells 22 in the corner portions of the orifice structure 20 are individually manifolded so that all such bells which are substantially equally distant from the center of the orifice are supplied with the same pressure. As shown in FIG. 4, each array of 3 bells which lies just outside of the outer hexagonal header 26, is provided with a manifold or header 42 supplied by an input conduit 44. In a like manner, each 2-bell array is provided with a manifold or header 46 supplied with an input conduit 48, such that a common supply of gas or air is supplied to each input conduit 48 so that all of the bells which are equally distant from the center of the orifice and supplied by a manifold 46 will be provided with the same pressure. The corner bells are each individually manifolded and provided with air under a common pressure from input conduits 50.

It thus can be seen from the schematic illustration shown in FIG. 4 that the various arrays of bells which are substantially equally distant from the center of the orifice are supplied with individual fluid pressures so that differential pressures may be obtained between adjacent concentric arrays of such bells. That is, fluid under one pressure may be supplied to one array of bells which are substantially equally distant from the center of the orifice structure, whereas another pressure may be supplied to another array of bells, radially spaced apart from the first array, but which are also substantially equally distant from the center of the orifice. It is thus possible to produce multi-bore tubing having uniform bores and wall thicknesses therebetween by controlling the differential pressures provided within the different bores which are radially spaced from the center of the forming orifice structure.

Figure 5:
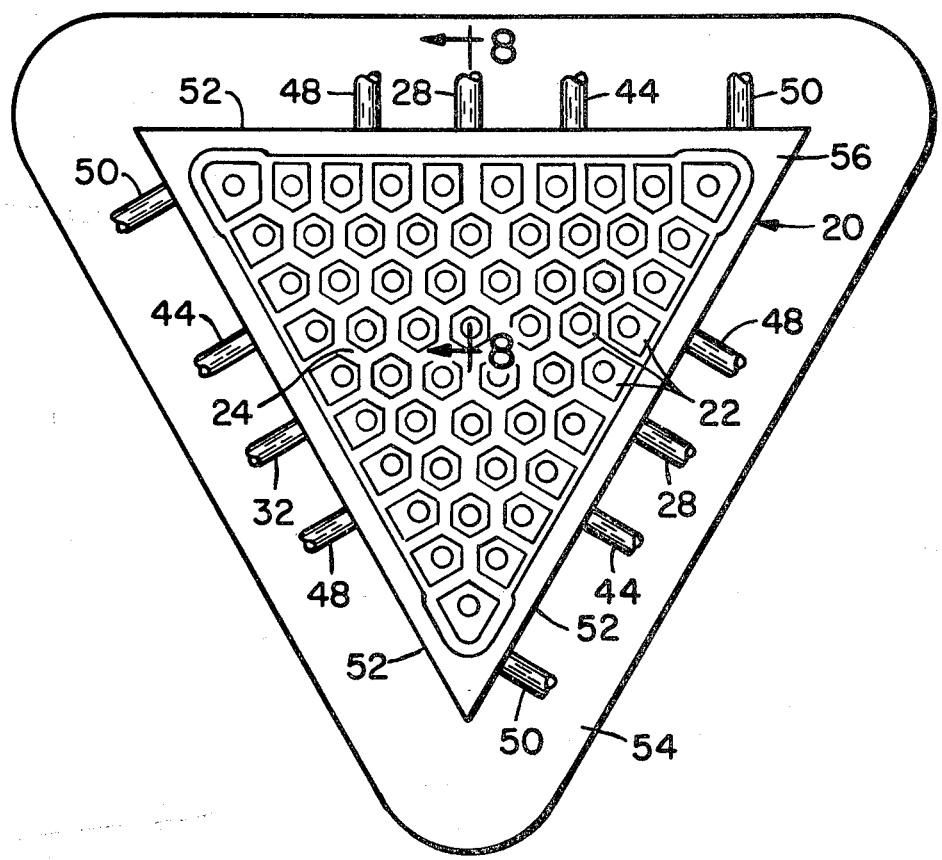
FIG. 5 is a bottom plan view of an orifice construction embodying the bell arrangement shown in FIG. 4.

As shown in FIG. 5, the bells 22 are generally of a hexagonal shape and are arranged in substantially concentric arrays about the center of the discharge passage 24 of the orifice structure 20. In order to provide the formed tubing with a more uniform outer wall surface, the peripheral bells 22 may be formed with a pentagonal configuration as shown in FIG. 5. The discharge passage 24 is bounded by a plurality of sidewalls 52 which extend downwardly from an upper supporting or connecting flange 54 and terminate in a lower peripheral bottom plate 56. When the orifice structure 20 is mounted in operable position, the upper connecting flange 54 is secured to the lower end of a feeder or forehearth in a customary manner so that molten glass flows downwardly through the discharge passage 24 and outwardly through the interconnected openings between the bells 22 so as to form multi-bore tubing having the same number of bores therewith as there are bells within the discharge passage.

Figure 7:
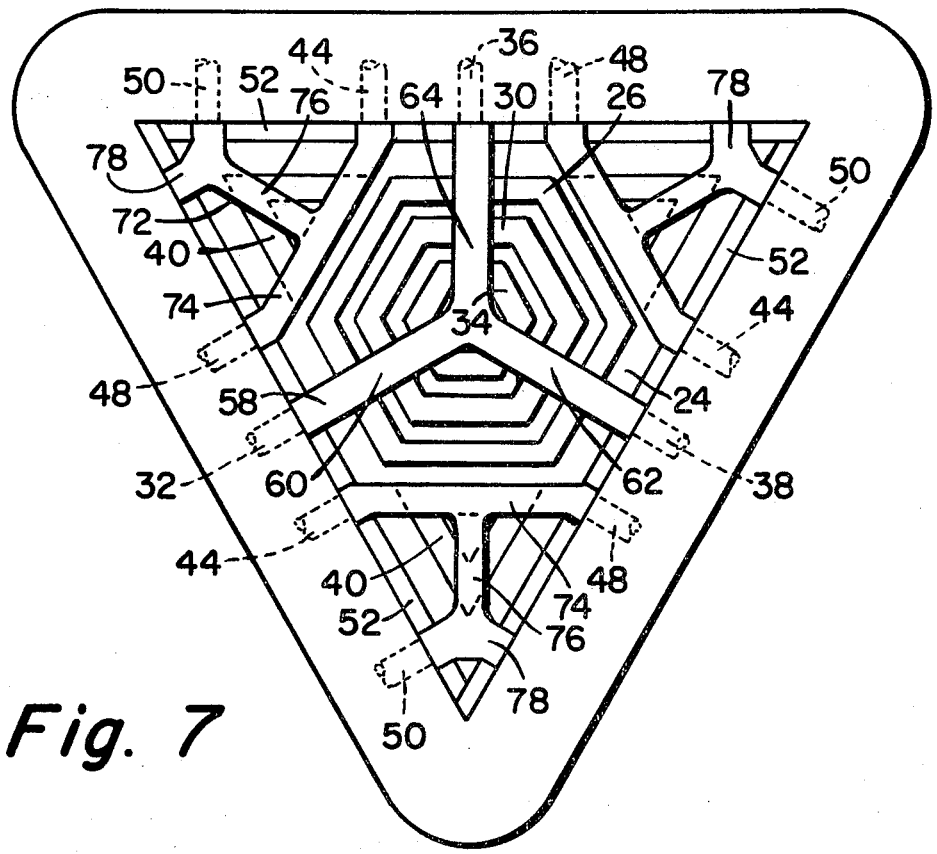
FIG. 7 is a top plan view of the orifice shown in FIG. 5, but with the bells omitted for purposes of clarity.

Referring now to FIG. 7, which illustrates the top or inlet end of the passage 24, a plurality of support beams are shown for not only supporting the various header assemblies and transmitting load forces to the exterior of the orifice assembly, but also for conducting a supply of air from the various input conduits to their respective headers. A central Y-shaped support beam 58 is shown having leg portions 60, 62 and 64 for not only supporting but supplying air to the central bell 22, outer hexagonal header 26, middle hexagonal header 30, and inner hexagonal header 34. Passages are formed in the various legs of the support beam for conducting air from the inlet conduits to their respective headers.

Figure 6:
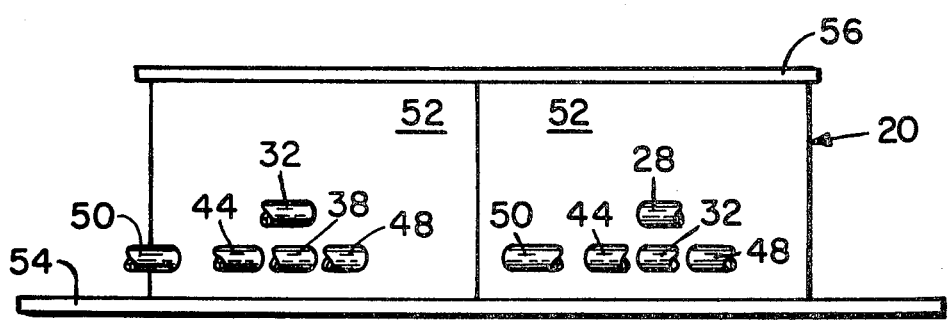
FIG. 6 is a side elevational view of the inverted orifice shown in FIG. 5.
Figure 8:
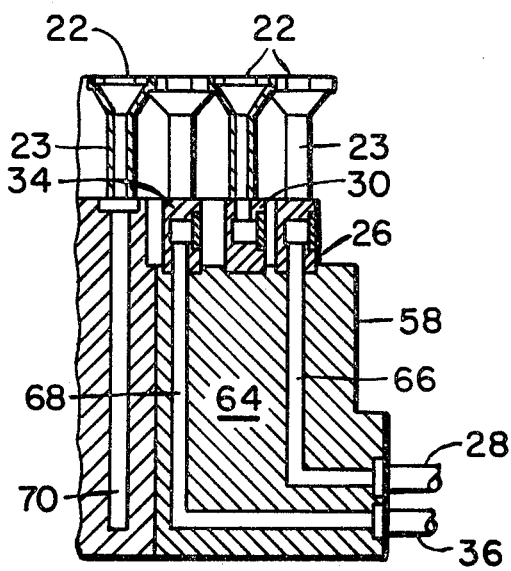
FIG. 8 is an enlarged elevational fragmental view in section taken along line 8—8 of FIG. 5.

That is, as shown in FIG. 8, passage 66 is formed in leg portion 64 to conduct fluid supplied by inlet conduit 28 to outer hexagonal header 26 and thereby supply the bells 22 in such array with a common pressure. In a like manner, passage 68 conducts fluid supplied by inlet conduit 36 to inner hexagonal header 34 and thereby supplies the bells 22 in such inner array with a common pressure, which is separate and distinct from that supplied to outer header 26. Further, a passage 70 supplied by inlet conduit 38 (as shown in FIGS. 4 and 6) conducts fluid under pressure to central bell 22, so that such bell is supplied with its own individual source of air under a pressure which is separate and distinct from the concentric arrays of bells surrounding such central bell. The various other legs 60 and 62 of central support beam 58 have similar passages for conducting fluid under pressure to the respective headers in the manner shown schematically in FIG. 4.

Corner support beams 72, each having a main cross arm portion 74, a trunk portion 76 and leg portions 78, are provided for supporting and supplying air to the triangular header portions 40 which are positioned in the corner portions of the orifice structure. Passages are formed in the leg portions 78 of corner support beams 72 for supplying air to the corner bells at a predetermined pressure. Further, passages extend through cross arm portion 74 and trunk portion 76 to connect inlet conduits 48 with their respetcive manifolds 46 for supplying a common source of air under pressure to all bells within such arrays. Finally, a further passage in cross arm portion 74 connects manifold 42 with inlet conduit 44 so as to supply a further source of air under pressure to all of the bells supplied by such manifold.

The orifice structure is preferably fabricated as an integrally welded assembly from high temperature or refractory metal such as platinum-rhodium alloy, molybdenum, and titanium. A bell 22 is provided for each hole or bore to be formed in the multiple-bore tubing. As shown particularly in FIGS. 5 and 8, each bell may be in a hollow conical shape with the bottom face or edge having a polygonal configuration. Each bell 22 is shown supported by a hollow bell shaft 23 which is connected to a header, such as 26, 30, 34 or 40. The headers not only support the individual bells 22 by means of shafts 23 and maintain them in a predetermined spaced-apart orientation, but also supply air to the bells through the hollow bell shafts. The various headers are in turn supported by the support beams 58, 72 which also have a plurality of passages for conducting fluid from the inlet conduits to their various headers.

By utilizing the header and pressure supply system as disclosed, wherein the corner bells are provided with one pressure, each manifold supplied with its own pressure, the hexagonal headers supplied with their individual pressures, and the central header supplied with its own pressure, it is possible to control wall thickness and bore size so as to provide dimensional uniformity along the multiple-bore tubing. Although the specific pressures utilized will vary with the size and composition of the tubing being formed, disregarding the center bell and the corner bells the pressure applied to the hexagonal headers generally increases from the outer header inwardly to the central header. The symmetrical concentric orientation of the headers in plan view was selected to permit a manifolding of all of the bells, which are substantially equally distant from the center of the orifice structure, with the same air pressure. Accordingly, those bells which are at different distances from the center of the orifice structure are provided with different air pressures, so as to facilitate uniformity in bore size in the formed tubing.

Not only is it possible to modify the orifice structure to vary the outer configuration of the resulting multi-bore tubing, but also the number of bells utilized to produce the bores or holes in the multiple-bore tubing may be varied to produce the desired result. As previously stated, the objective of the present invention is to produce multiple-bore tubing having an open frontal area of cross section of from 40% to 80% with a hole density of at least two hundred holes per square inch. The minimium standard may be obtained by producing multiple-bore tubing having hole openings of about .100 inch with wall thicknesses of about .008 inch, thus resulting in an open frontal area of about 40% having approximately 100 holes per square inch.

The stated upper limit of 80% open frontal area may be obtained by producing multiple-bore tubing having hole diameters of about .005 inch with wall thicknesses of about .001 inch, thus providing a hole density of about 40,000 holes per square inch. A good working example intermediate the two extremes would be obtained by producing multiple-bore tubing having a hole diameter of about .03 inch with wall thicknesses of about .0035 inch, thus producing tubing having an open frontal area of between about 75% and 80% with a hole density of about 1000 holes per square inch. The bells which produce the multiple bores are preferably positioned in a concentric radially disposed arrangement which produces thin-walled multiple-bore tubing having concentric radially disposed bores with the desired open frontal area and hole density.

As a specific illustration, but by no means limiting in nature, a triangular-shaped orifice structure having 55 bells was fabricated from an 80% platinum-20% rhodium alloy. The bells had a hexagonal configuration with a distance of .600 inch from flat to flat, and a uniform spacing of .115 inch therebetween. A 40 inch head of molten glass at a viscosity of about 7,000 poises was delivered to the orifice at a rate of about 415 pounds per hour. The center bell was supplied with an air flow of .73 cubic inch per minute with a pressure of .37 inch of water column. The inner hexagonal header was supplied with an air flow of 3.71 cubic inch per minute with a pressure of .50 inch of water column. The middle hexagonal header was supplied with an air flow of 7.26 cubic inch per minute at a pressure of .42 inch of water column. The outer hexagonal header was supplied with an air flow of 8.20 cubic inch per minute with a pressure of .35 inch of water column. The inner manifold was supplied with an air flow of 5.38 cubic inch per minute with a pressure of .39 inch of water column. The outer manifold was supplied with an air flow of 3.65 cubic inch per minute with a pressure of .42 inch of water column. And the corner bells were provided with an air flow of 2.09 cubic inch per minute at a pressure of .43 inch of water column. Tubing was drawn at a rate of about 430 feet per minute producing triangular shaped tubing having 55 holes with a hole diameter of about .027 inch and a wall thickness therebetween of about .003 inch, resulting in an open frontal area of approximately 70% with a hole density of about 1300 holes per square inch of cross-sectional area.

As previously pointed out, the particular geometry of the discharge orifice and the arrangement of the bells positioned therein may be varied as desired; however, the manifolding of such bells must maintain a degree of symmetry about the center of the discharge passageway of the orifice in order that uniform bores are formed across the multiple-bore tubing produced by such orifice.

Although a specific construction of bells and headers have been disclosed, it will be apparent that virtually any type of bell and header construction may be utilized as desired, with the only criteria being that each header must uniformly deliver a source of air under a desired pressure to a plurality of bells uniformly spaced-apart from the center of the orifice, and such bells must be hollow so as to supply air within the glass flowing thereover to produce a hollow bore. It will further be appar-

I claim:

1. In an orifice structure for forming multiple-bore tubing by flowing molten glass downwardly through a geometrically-shaped discharge passage an improved header system comprising, a plurality of bells positioned within said discharge passage in symmetrical arrays about the center thereof with the bells in each separate array being substantially equally distant from said center, header means concentrically arranged about the center of said discharge passage for supplying a separate source of air pressure to each array of said bells, the number of bells in one array varying with respect to the number of bells in an adjacent array, and all of the bells in one array connected to a common air pressure and those in another array of bells connected to a different air pressure.

2. In orifice structure as defined in claim 1, the improvement comprising a plurality of hexagonally-shaped header means concentric about a center bell within said discharge passage, means supplying each of said hexagonal header means with a separate source of air under pressure so that different arrays of concentric bells will be supplied with different air pressures depending upon the distance of such array from the center of said orifice, and the greater the distance each of said concentric hexagonally-shaped header means is positioned from said center bell the greater the number of bells such header means supplies with air.

3. In orifice structure as defined in claim 2 the improvement comprising a triangular-shaped discharge passage, a plurality of spaced-apart discontinuous header means positioned radially-outwardly from and parallel to a portion of said hexagonally-shaped header means, and such discontinuous header means as are equally spaced from said center bell being connected with a common source of air under pressure.

4. In orifice structure as defined in claim 3 the improvement comprising triangular header means for supplying air under pressure to bells within corner portions of said triangular-shaped discharge passage, and all said triangular-shaped header means being connected to at least one common source of air under pressure.

5. A header system for forming multi-bore tubing having uniform bore sizes and wall thicknesses which comprises, an orifice structure having wall portions defining a discharge passage, a plurality of radially spaced-apart headers arranged in said discharge passage in symmetric arrays about the center of said discharge passage, means for supplying a separate source of air under pressure to each said header, a plurality of bells connected to each said header, the number of bells connected to a given header being different from the number of bells connected to an adjacent header, the bells connected to one header being substantially equally distant from the center of said orifice, the bells connected to another header also being substantially equally distant from the center of said orifice but radially disposed with respect to said one header, and support means for supporting said various headers within the discharge passage of said orifice structure.

6. A header system for forming multi-bore tubing as defined in claim 5 wherein a central bell, positioned centrally of said discharge orifice, is provided with a separate source of air under pressure.

7. A header system for forming multi-bore tubing as defined in claim 5 wherein a plurality of corner bells, which are substantially equally distant from the center of said discharge passage, are provided with a common source of air under pressure which is separate from that supplied to the previously mentioned headers.

8. A header system for forming multi-bore tubing as defined in claim 5 wherein said plurality of headers includes a plurality of hexagonal headers concentrically arranged about the center of said discharge passage and a plurality of manifolds in corner portions of said discharge passage exterior of said hexagonal headers, and the air pressure supplied to said concentrically arranged hexagonal headers increases from an outer of said hexagonal headers toward an inner of said hexagonal headers.

References Cited

UNITED STATES PATENTS

| | | | |
|---|---|---|---|
| 2,131,417 | 9/1938 | Danner | 65—187 X |
| 3,121,254 | 2/1964 | Heynen et al. | 65—1 X |
| 3,240,583 | 3/1966 | Holler | 65—88 X |
| 3,268,313 | 8/1966 | Burgman et al. | 65—86 X |
| 3,303,011 | 2/1967 | Fukuzaki | 65—86 X |
| 3,607,185 | 9/1971 | Andrysiak et al. | 65—86 X |

FRANK W. MIGA, Primary Examiner

U.S. Cl. X.R.

65—130, 191, 86, DIG. 7